United States Patent
Osawa et al.

(10) Patent No.: US 10,345,181 B2
(45) Date of Patent: Jul. 9, 2019

(54) HYDRAULIC PRESSURE SENSOR ATTACHMENT STRUCTURE

(71) Applicant: Nidec Tosok Corporation, Zama-shi, Kanagawa (JP)

(72) Inventors: Tomoka Osawa, Zama (JP); Hironobu Wakabayashi, Zama (JP); Toshiaki Nakamura, Zama (JP); Hiroshi Tatsuta, Zama (JP); Kenichi Ozawa, Kyoto (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 40 days.

(21) Appl. No.: 15/713,768

(22) Filed: Sep. 25, 2017

(65) Prior Publication Data

US 2018/0087992 A1     Mar. 29, 2018

(30) Foreign Application Priority Data

Sep. 26, 2016  (JP) .................................. 2016-186930

(51) Int. Cl.
| | | |
|---|---|---|
| *G01L 9/00* | (2006.01) | |
| *G01L 19/14* | (2006.01) | |
| *F15B 13/08* | (2006.01) | |
| *F15B 13/042* | (2006.01) | |

(52) U.S. Cl.
CPC .......... *G01L 19/147* (2013.01); *F15B 13/042* (2013.01); *F15B 13/086* (2013.01); *G01L 9/0091* (2013.01)

(58) Field of Classification Search
CPC ...... G01L 19/147; G01L 9/0091; F15B 13/86; F15B 13/42
See application file for complete search history.

(56) References Cited

U.S. PATENT DOCUMENTS

| | | | |
|---|---|---|---|
| 2010/0186830 A1* | 7/2010 | Shigyo ................ | F16H 61/0009 137/334 |
| 2015/0137281 A1* | 5/2015 | Imai ..................... | B81B 7/0051 257/415 |
| 2017/0315011 A1* | 11/2017 | Osawa .................. | G01L 19/147 |
| 2018/0087990 A1* | 3/2018 | Osawa .................. | G01L 19/143 |

(Continued)

FOREIGN PATENT DOCUMENTS

| | | |
|---|---|---|
| JP | 2010-174991 A | 8/2010 |
| JP | 2015-096843 A | 5/2015 |

*Primary Examiner* — James E Williams
(74) *Attorney, Agent, or Firm* — Keating & Bennett, LLP

(57) ABSTRACT

A guide protrusion includes first walls protruding upwards from an upper face of a body, facing each other across an opening in a first direction, and first protrusions protruding from each first wall toward the other. A receptive portion between the first walls has a first opening, opening to one side in a second direction orthogonal to the first direction. The sensor case is received from the first opening following the second direction. The guide protrusion has a first movement restricting face facing another side in the second direction. The sensor case includes a columnar portion extending vertically through a gap between the first protrusions, a flange at least partially between the upper face and the first protrusions in the vertical direction, within the receptive portion, and a facing portion on the other side of the first movement restricting face in the second direction, facing the first movement restricting face.

8 Claims, 6 Drawing Sheets

(56) References Cited

U.S. PATENT DOCUMENTS

2018/0143093 A1* 5/2018 Osawa .................. G01L 19/003
2018/0149539 A1* 5/2018 Osawa .................. G01L 19/143
2018/0283970 A1* 10/2018 Osawa .................. G01L 9/0041
2018/0283972 A1* 10/2018 Osawa ................ G01L 19/0092

* cited by examiner

HYDRAULIC PRESSURE SENSOR ATTACHMENT STRUCTURE

CROSS REFERENCE TO RELATED APPLICATIONS

This application claims the benefit of priority to Japanese Patent Application No. 2016-186930 filed on Sep. 26, 2016. The entire contents of this application are hereby incorporated herein by reference.

BACKGROUND OF THE INVENTION

1. Field of the Invention

The present invention relates to a hydraulic pressure sensor attachment structure.

2. Description of the Related Art

There is known a hydraulic control device having a hydraulic pressure sensor.

For example, a hydraulic pressure sensor is attached to a control valve to which an oil channel is provided, as illustrated in Japanese Unexamined Patent Application Publication No. 2010-174991.

As a method to attach a hydraulic pressure sensor such as described above to a control valve, there is a method of attaching the hydraulic pressure sensor from the outside of the control valve. Examples of this method include a method where a male screw portion is provided to the hydraulic pressure sensor, and the male screw portion of the hydraulic pressure sensor is screwed into a female screw hole provided to the control valve, from the outside of the control valve, a method of fixing the hydraulic pressure sensor to the control valve using a separate attachment member, and so forth.

The pressure of the oil to be measured, which is applied to the hydraulic pressure sensor in a hydraulic control device, is great, so the attachment strength of the hydraulic pressure sensor to the control valve needs to be sufficiently great. Accordingly, in the above-described case of screwing the male screw portion of the hydraulic pressure sensor into the female screw hole, the hydraulic pressure sensor tends to be large in size, since the portion where the screw portions engage needs to be sufficiently long. In a case of using a separate attachment member, the size of the attachment member tends to be large in size in order to ensure attachment strength of the hydraulic pressure sensor. Thus, there has been a problem regarding ensuring sufficient attachment strength of hydraulic pressure sensors, in that the size of the overall hydraulic control device tends to be great.

The present invention has been made in light of the above problems, and accordingly it is an object thereof to provide a hydraulic pressure sensor attachment structure that can suppress increased size of the overall hydraulic control device while ensuring attachment strength of the hydraulic pressure sensor.

SUMMARY OF THE INVENTION

A hydraulic pressure sensor attachment structure includes a guide protruding portion and a sensor case. The hydraulic pressure sensor attachment structure is configured to attach a hydraulic pressure sensor that measures pressure of oil flowing through an oil channel of an oil channel body having the oil channel therein, to an upper face of the oil channel body. The oil channel body has, on the upper face, an oil channel opening connecting to the oil channel. The hydraulic pressure sensor includes a sensor main unit and the sensor case covering the sensor main unit. The sensor case has, on a lower face thereof, a sensing hole that connects to the oil channel opening in a state where the hydraulic pressure sensor is attached to the upper face. The guide protruding portion disposed on the upper face and includes a pair of first wall portions that protrude toward an upper side from the upper face, and face each other across the oil channel opening in a first direction out of horizontal directions, and first protruding portions that protrude from each first wall portion toward the opposing first wall portion at the other side, and face each other in the first direction across a gap. A receptive portion is provided between the first wall portions. The receptive portion has a first receptive opening that opens to one side in a second direction orthogonal to the first direction out of horizontal directions, and the sensor case can be received from the first receptive opening following the second direction. The guide protruding portion has a first movement restricting face that faces another side in the second direction. The sensor case includes a column-shaped portion extending in a vertical direction and passed through the gap between the first protruding portions, a flange portion that protrudes toward an outer side from the column-shaped portion in a radial direction of the column-shaped portion, and that is at least partially situated between the upper face and the first protruding portions in the vertical direction, within the receptive portion, and a facing portion that is disposed on the other side of the first movement restricting face in the second direction and faces the first movement restricting face.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
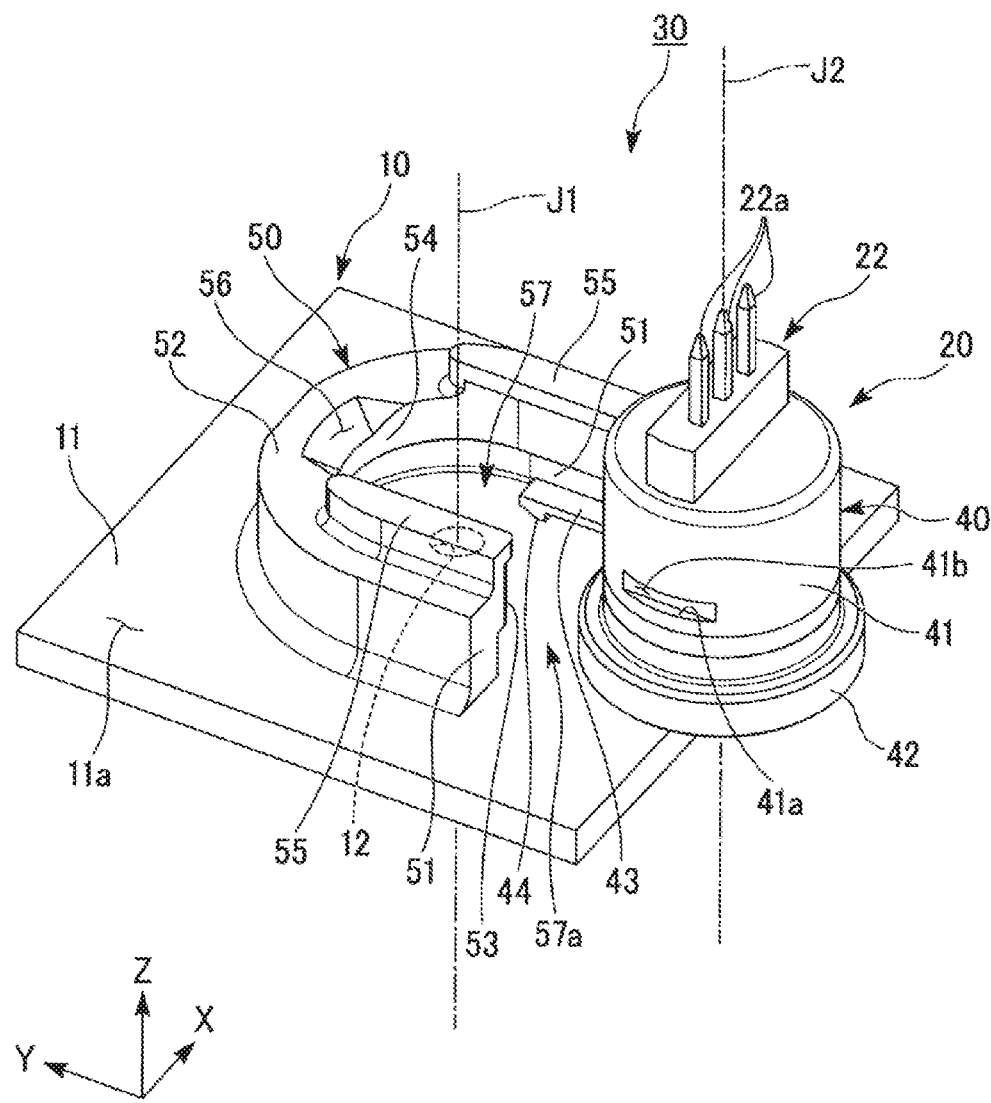
FIG. 1 is a perspective view illustrating a hydraulic pressure sensor attachment structure according to a first embodiment.

In the drawings, the Z-axis direction is the vertical direction Z. The X-axis direction is, of horizontal directions orthogonal to the vertical direction Z, the lateral direction (first direction) X. The Y-axis direction is, of horizontal directions orthogonal to the vertical direction Z, the depth direction (second direction) Y that is orthogonal to the lateral direction X. The positive side of the vertical direction Z will be referred to as "upper side", and the negative side as the "lower side". The positive side of the depth direction Y will be referred to as the "front side (other side in second direction)", and the negative side as the "back side (one side in second direction)". Note that the upper side, lower side, front side, back side, vertical direction, lateral direction, and depth direction, are only names for describing the relative layout of parts, and do not restrict the actual layout or the like.

First Embodiment

Figure 2:
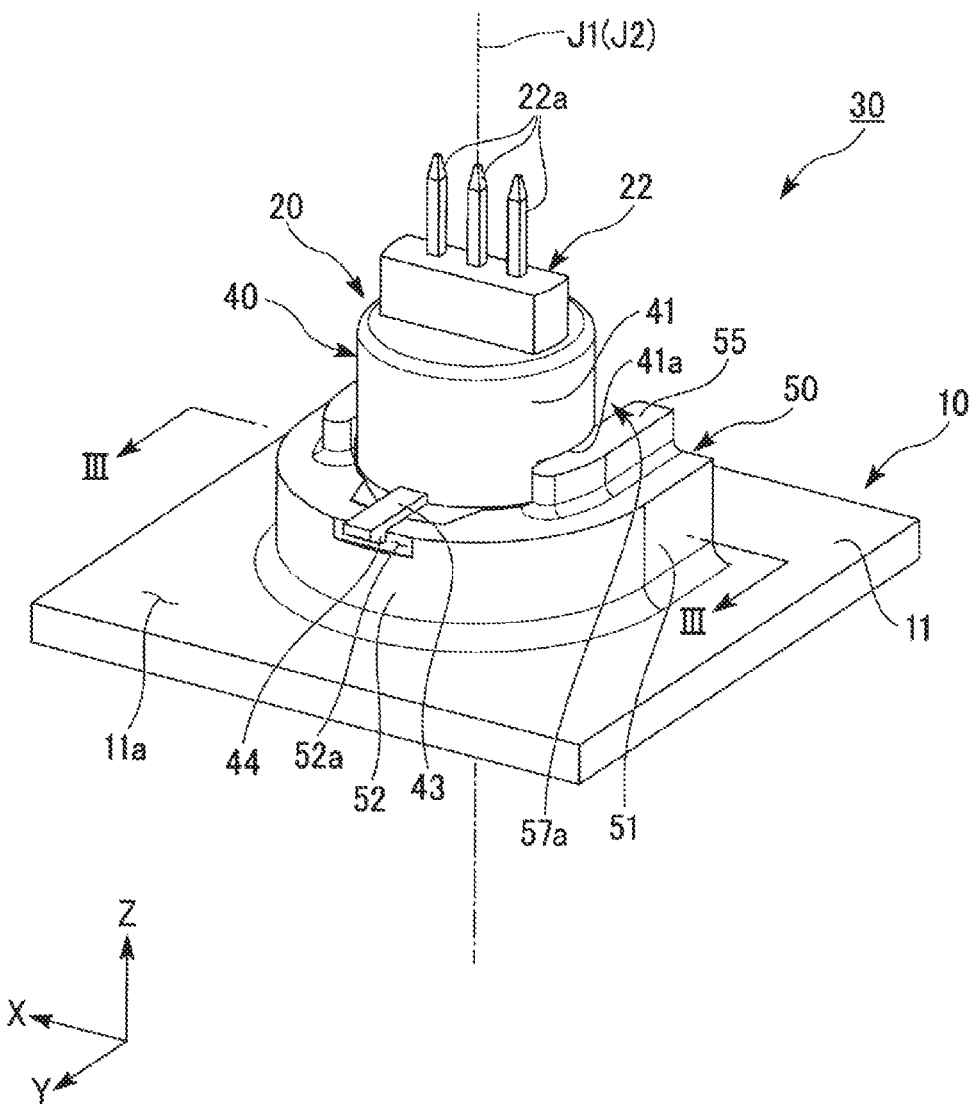
FIG. 2 is a perspective view illustrating the hydraulic pressure sensor attachment structure according to the first embodiment.
Figure 3:
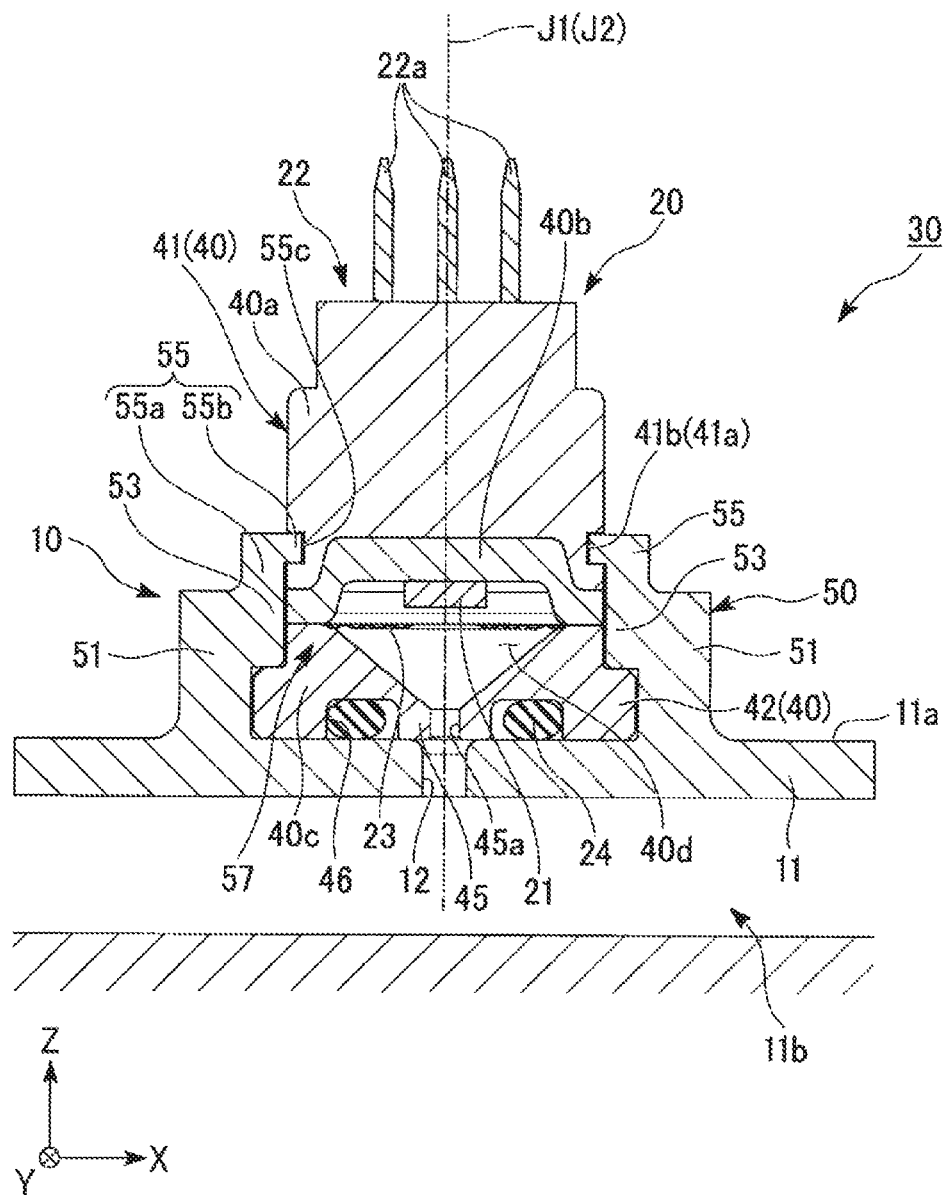
FIG. 3 is a cross-sectional view taken along III-III in FIG. 2, illustrating the hydraulic pressure sensor attachment structure according to the first embodiment.

A hydraulic pressure sensor attachment structure 30 according to a first embodiment, illustrated in FIGS. 1 through 3, attaches a hydraulic pressure sensor 20 to a control valve 10 of a hydraulic pressure control device. More specifically, the hydraulic pressure sensor attachment structure 30 attaches the hydraulic pressure sensor 20 to an upper face 11a of an oil channel body 11 of the control valve 10. The oil channel body 11 has an oil channel 11b therein, through which oil flows, as illustrated in FIG. 3. The hydraulic pressure sensor 20 measures the pressure of oil flowing through the oil channel 11b. The oil channel body 11 has an oil channel opening 12 in the upper face 11a, connecting to the oil channel 11b. The oil channel opening 12 has a circular shape centered on a first center axis J1 extending on the vertical direction Z, as illustrated in FIG. 1. Note that in the following description, the side of a certain object that is closer to the first center axis J1 in the lateral direction X will be referred to as "inner side in lateral direction", and the side that is farther from the first center axis J1 in the lateral direction will be referred to as "outer side in lateral direction".

FIG. 1 illustrates the state of the hydraulic pressure sensor 20 before being attached to the upper face 11a of the oil channel body 11. FIGS. 2 and 3 illustrate the state of the hydraulic pressure sensor 20 attached to the upper face 11a of the oil channel body 11 by the hydraulic pressure sensor attachment structure 30. Note that the state before the hydraulic pressure sensor 20 is attached to the upper face 11a of the oil channel body 11 by the hydraulic pressure sensor attachment structure 30 will be referred to as "unattached state", and the state where the hydraulic pressure sensor 20 is attached to the upper face 11a of the oil channel body 11 will be referred to as "attached state". The hydraulic pressure sensor attachment structure 30 includes a guide protruding portion 50 that the control valve 10 has, and a sensor case 40 of the hydraulic pressure sensor 20.

The guide protruding portion 50 is disposed on the upper face 11a of the oil channel body 11, as illustrated in FIG. 1. The guide protruding portion 50 has a pair of first wall portions 51, a second wall portion 52, first protruding portions 53, a second protruding portion 54, and rotation restricting portions 55. The pair of first wall portions 51 protrude toward the upper side from the upper face 11a of the oil channel body 11. The pair of first wall portions 51 face each other across the oil channel opening 12 in, of the horizontal directions, the lateral direction X. The first wall portions 51 extend in parallel to each other following the depth direction Y.

The second wall portion 52 protrudes toward the upper side from the upper face 11a of the oil channel body 11. The second wall portion 52 connects between the end portions of the pair of first wall portions 51 at the front side. The second wall portion 52 extends in a circumferential direction centered on the first center axis J1. The shape of the second wall portion 52 as viewed from the upper side is a semicircular arc that protrudes toward the front side. Connecting the pair of first wall portions 51 and the second wall portion 52 forms a U-shaped wall portion that opens toward the back side, as viewed from the upper side.

The second wall portion 52 has a first movement restricting face 52a on the face at the front side, i.e., on a face at the opposite side from a later-described first receptive opening 57a, as illustrated in FIG. 2. That is to say, the guide protruding portion 50 has the first movement restricting face 52a, and the first movement restricting face 52a is provided on the second wall portion 52 in the present embodiment. The first movement restricting face 52a is a face that faces toward the front side. The first movement restricting face 52a has a rectangular shape that is slender in the lateral direction X as viewed from the front side. The first movement restricting face 52a is a flat face that is orthogonal with the depth direction Y in the present embodiment.

The first protruding portions 53 each protrude from the respective first wall portions 51 toward the opposing first wall portions 51 at the other side, as illustrated in FIG. 3. More specifically, the first protruding portions 53 protrude from the upper end of the first wall portions 51 toward the inner side in the lateral direction. The pair of first protruding portions 53 provided to the first wall portions 51 mutually extend in the lateral direction X across a gap. The first protruding portions 53 extend from the back ends of the first wall portions 51 to the front ends thereof, following the depth direction Y.

The second protruding portion 54 protrudes from the second wall portion 52 toward the back side, i.e., toward the later-described first receptive opening 57a in the depth direction Y, as illustrated in FIG. 1. More specifically, the second protruding portion 54 protrudes toward the back side from the upper end of the second wall portion 52. The second protruding portion 54 extends as an arc from one end of the second wall portion 52 to the other end thereof, following the circumferential direction centered on the first center axis J1. The second protruding portion 54 connects the end portions of the pair of first protruding portions 53 at the front side.

An inclined face 56 is provided on the upper face of the second protruding portion 54. The inclined face 56 is a flat inclined face arranged such that the inclined face 56 is closer to the upper side at the front side as compared to at the back side. The inclined face 56 faces the upper side and back side. The end of the inclined face 56 at the back side is situated on the lower side from the upper end of the second wall portion 52 in the vertical direction Z, and is also situated at the same position as the back-side end of the second protruding portion 54 in the depth direction Y. The front-side end of the inclined face 56 is situated at the same position as the upper face of the second wall portion 52 in the vertical direction Z.

The rotation restricting portions 55 are provided on the upper faces of each of the pair of first protruding portions 53. The rotation restricting portions 55 extend from the back-side end of the first protruding portions 53 to the front-side end, following the depth direction Y. The rotation restricting portions 55 each have a base portion 55a extending toward the upper side from the upper face of the first protruding portion 53, and an insertion guide portion 55b extending toward the inner side in the lateral direction from the upper end of the base portion 55a, as illustrated in FIG. 3. The faces of the insertion guide portions 55b at the inner side in the lateral direction are protruding-portion-facing faces 55c extending in straight lines along the depth direction Y. That is to say, the guide protruding portion 50 has protruding-portion-facing faces 55c.

A receptive portion 57 is provided between the first wall portions 51, as illustrated in FIG. 1. The receptive portion 57 in the present embodiment is the space on the inner side of the guide protruding portion 50, and is configured surrounded by the first wall portions 51, second wall portion 52, first protruding portions 53, and second protruding portion 54. The receptive portion 57 has the first receptive opening 57a that opens toward the back side. The second wall portion 52 faces the first receptive opening 57a across a gap in the depth direction Y, and is situated across the oil channel opening 12 from the first receptive opening 57a. The receptive portion 57 is capable of receiving the sensor case 40 along the depth direction Y from the first receptive opening 57a. The receptive portion 57 opens upwards.

The hydraulic pressure sensor 20 has the sensor case 40, a sensor main unit 21, a connection terminal 22, a diaphragm 23, and an O-ring 24, as illustrated in FIG. 3. The sensor case 40 covers the sensor main unit 21 as illustrated in FIG. 1. The sensor case 40 has a column-shaped portion 41, a flange portion 42, an extending portion 43, and a facing portion 44.

The column-shaped portion 41 extends in the vertical direction Z. The shape of the column-shaped portion 41 in the present embodiment is a cylinder centered on a second center axis J2 extending in the vertical direction Z. The second center axis J2 agrees with the first center axis J1 in an attached state, as illustrated in FIGS. 2 and 3. The column-shaped portion 41 has an insertion groove 41a where the outer peripheral face of the column-shaped portion 41 is recessed in the lateral direction X, as illustrated in FIG. 1. The insertion groove 41a extends in a straight line in the depth direction Y, and is opened at both ends in the depth direction Y. Case facing faces 41b are bottom faces facing the outer side in the lateral direction of the insertion groove 41a. That is to say, the sensor case 40 has the case facing faces 41b. The case facing faces 41b extend in a straight line following the depth direction Y. The case facing faces 41b are flat faces orthogonal to the lateral direction X.

The column-shaped portion 41 has an annular seal groove 46 where the lower face of the column-shaped portion 41 is recessed toward the upper side, as illustrated in FIG. 3. The seal groove 46 has a toric shape centered on the second center axis J2. A protrusion 45 that protrudes toward the lower side is formed on the inner side of the seal groove 46 as a result of the seal groove 46 having been provided. A sensing hole 45a where the lower face of the protrusion 45 is recessed to the upper side and is connected with a later-described accommodation space 40d is provided to the protrusion 45. That is to say, the sensor case 40 has the sensing hole 45a on the lower face of the sensor case 40. The sensing hole 45a connects to the oil channel opening 12 in a state where the hydraulic pressure sensor 20 is attached on the upper face 11a of the oil channel body 11. The O-ring 24 is disposed within the seal groove 46. The O-ring 24 seals between the upper face 11a of the oil channel body 11 and the sensor case 40.

The flange portion 42 protrudes from the column-shaped portion 41 toward the outer side in the radial direction of the column-shaped portion 41, i.e., toward the outer side in the radial direction centered on the second center axis J2. More specifically, the flange portion 42 protrudes from a lower end portion of the column-shaped portion 41 toward the outer side in the radial direction centered on the second center axis J2. The flange portion 42 has a toric shape that surrounds the column-shaped portion 41 around the second center axis J2.

The extending portion 43 is formed extending in the depth direction Y from a portion on the column-shaped portion 41 further toward the upper side than the second wall portion 52, as illustrated in FIG. 2. The extending portion 43 is disposed further toward the upper side than the flange portion 42. The extending portion 43 is a plate-shaped member of which the plate face is orthogonal with the vertical direction Z. In the attached state, the extending portion 43 extends in the depth direction Y to the opposite side of the second wall portion 52 from first receptive opening 57a, i.e., to the front side. The extending portion 43 is formed of resin, for example.

The facing portion 44 is provided on the tip of the extending portion 43. The facing portion 44 in the present embodiment is a claw portion that hooks onto the first movement restricting face 52a. The facing portion 44 protrudes from the extending portion 43 toward the lower side. The lower end of the facing portion 44 is disposed further on the lower side as compared to the upper face of the second wall portion 52. The facing portion 44 is situated at a position overlapping the inclined face 56 and first movement restricting face 52a in the depth direction Y direction.

The sensor case 40 in the present embodiment is made up of three members; an upper side case 40a, a lid 40b, and a lower side case 40c, as illustrated in FIG. 3. The upper side case 40a is a portion that makes up the upper portion of the column-shaped portion 41. The insertion groove 41a and extending portion 43 are provided to the upper side case 40a. The upper side case 40a is a single member formed of resin, for example. The lower side case 40c is a portion making up the lower portion of the column-shaped portion 41. The flange portion 42 is provided to the lower side case 40c. The lower side case 40c is a single member formed of metal, for example. The lid 40b is sandwiched between the upper side case 40a and lower side case 40c in the vertical direction Z, in a state of being in contact with both.

The accommodation space 40d is provided between the lower side case 40c and lid 40b in the vertical direction Z. The accommodation space 40d is partitioned in the vertical direction Z by the diaphragm 23. The upper end of the sensing hole 45a opens into the lower portion of the accommodation space 40d. The sensor main unit 21 is disposed on the lower face of the lid 40b within the upper portion of the accommodation space 40d. The upper portion of the accommodation space 40d is filled with a pressure transmission fluid. In the attached state, oil flows into the lower portion of the accommodation space 40d, via the sensing hole 45a connected to the oil channel opening 12. The pressure of the oil that has flowed into the lower portion of the accommodation space 40d is applied to the sensor main unit 21 via the diaphragm 23 and pressure transmission fluid. Accordingly, the hydraulic pressure of the oil within the oil channel 11b can be measured by the sensor main unit 21.

The connection terminal 22 is disposed at the upper end of the column-shaped portion 41. The connection terminal 22 has three connecting pins 22a extending in the vertical direction Z. The connecting pins 22a are connected to an unshown external device such as a power source or the like, and electrically connect the sensor main unit 21 to the external device, which is omitted from illustration here.

When attaching the hydraulic pressure sensor 20 to the oil channel body 11 by the hydraulic pressure sensor attachment structure 30, the person performing the attachment moves the hydraulic pressure sensor 20 toward the front side in a state where the lower face of the hydraulic pressure sensor

20 is in contact with the upper face 11*a* of the oil channel body 11 as illustrated in FIG. 1, and inserts into the receptive portion 57 of the guide protruding portion 50 from the first receptive opening 57*a*. Upon the hydraulic pressure sensor 20 being inserted into the receptive portion 57, the column-shaped portion 41 is passed into the gap between the first protruding portions 53, as illustrated in FIG. 3. That is to say, the upper portion of the column-shaped portion 41 protrudes further toward the upper side than the receptive portion 57, via the opening at the upper side of the receptive portion 57. The flange portion 42 is at least partially situated between the upper face 11*a* of the oil channel body 11 and the first protruding portions 53 in the vertical direction Z, within the receptive portion 57. Accordingly, the flange portion 42 is retained by the first protruding portions 53, thereby suppressing the hydraulic pressure sensor 20 from moving toward the upper side. In the attached state of the present embodiment, the O-ring 24 exhibits elastic deformation in the vertical direction Z, thereby applying upward force to the sensor case 40. Accordingly, the flange portion 42 is pressed by the first protruding portions 53 from the lower side.

Moving the hydraulic pressure sensor 20 inserted into the receptive portion 57 further toward the front side, the facing portion 44 comes into contact with the inclined face 56. Accordingly, the facing portion 44 is elastically deformed toward the upper side following the inclined face 56, as the hydraulic pressure sensor 20 moves toward the front side. The facing portion 44 is provided on the tip of the extending portion 43 in the present embodiment, so the facing portion 44 readily exhibits elastic deformation due to the extending portion 43 exhibiting elastic deformation. When the hydraulic pressure sensor 20 further moves toward the front side, and the facing portion 44 passes over the upper face of the second wall portion 52 and is moved further to the front side than the second wall portion 52, the extending portion 43 and facing portion 44 that had been elastically deformed are restored and move downwards. Thus, the facing portion 44 is situated at the front side of the first movement restricting face 52*a* and faces the first movement restricting face 52*a*, as illustrated in FIG. 2. Accordingly, the facing portion 44 is hooked by the first movement restricting face 52*a*, so the hydraulic pressure sensor 20 inserted into the receptive portion 57 can be restricted from returning toward the back side. The hydraulic pressure sensor 20 can thus be attached to the oil channel body 11 using the hydraulic pressure sensor attachment structure 30.

Thus, according to the present embodiment, movement of the hydraulic pressure sensor 20 toward the upper side can be suppressed by the flange portion 42, and the hydraulic pressure sensor 20 can be suppressed from moving toward the back side and coming loose from the first receptive opening 57*a* by the facing portion 44. Further, movement of the hydraulic pressure sensor 20 in the lateral direction X can be suppressed by the pair of first wall portions 51 or pair of first protruding portions 53.

Accordingly, even in a case where high pressure is applied to the hydraulic pressure sensor 20 attached to the oil channel body 11 by oil pressure, the hydraulic pressure sensor 20 can be suppressed from coming loose from the oil channel body 11. Also, there is no need to use screws and attaching members, so the size of the hydraulic pressure sensor 20 can be reduced, and the number of parts of the hydraulic pressure sensor attachment structure 30 can be reduced. Thus, the hydraulic pressure sensor attachment structure 30 according to the present embodiment enables increased size of the overall hydraulic control device to be suppressed while ensuring attachment strength of the hydraulic pressure sensor 20. The number of parts of the hydraulic pressure sensor attachment structure 30 can also be suppressed from greatly increasing, thereby suppressing the manufacturing cost of the hydraulic control device from increasing. The hydraulic pressure sensor 20 can be attached by inserting the hydraulic pressure sensor 20 into the receptive portion 57 and hooking the facing portion 44 on the first movement restricting face 52*a*, so attaching the hydraulic pressure sensor 20 to the oil channel body 11 is simple and easy.

Note that movement of the hydraulic pressure sensor 20 in the lateral direction X may be suppressed by the column-shaped portion 41 coming into contact with the first protruding portions 53, or may be suppressed by the flange portion 42 coming into contact with the first wall portions 51.

Also, according to the present embodiment, the facing portion 44 is provided to the tip of the extending portion 43, so the extending portion 43 can be elastically deformed and the facing portion 44 hooked onto the first movement restricting face 52*a* by snap-fitting, by moving the hydraulic pressure sensor 20 toward the front side. Accordingly, the hydraulic pressure sensor 20 can be easily attached by the hydraulic pressure sensor attachment structure 30. The facing portion 44 serves as a claw portion that hooks onto the first movement restricting face 52*a*, so the hydraulic pressure sensor attachment structure 30 can be simplified.

The second wall portion 52 is disposed across the oil channel opening 12 from the first receptive opening 57*a*, so the hydraulic pressure sensor 20 can suppressed from moving toward the front side by the second wall portion 52. The first movement restricting face 52*a* is provided to the second wall portion 52, so the position at which the facing portion 44 hooks can be made to be the middle in the lateral direction X, and movement of the hydraulic pressure sensor 20 toward the back side can be suppressed in a stable manner by the single facing portion 44.

Although omitted from illustration, when in the attached state in the present embodiment, part of the flange portion 42 is positioned between the oil channel body 11 of the oil channel body 11 and the second protruding portion 54 in the vertical direction Z. The portion of the flange portion 42 toward the front side is positioned between the upper face 11*a* and the second protruding portion 54 in the vertical direction Z in the present embodiment. Accordingly, movement of the flange portion 42 toward the upper side can be suppressed by both the first protruding portions 53 and the second protruding portion 54, so the hydraulic pressure sensor 20 can be attached more firmly in the vertical direction Z.

If the hydraulic pressure sensor 20 rotates on the second center axis J2 for example, in the attached state, there are cases where the facing portion 44 comes loose from the first movement restricting face 52*a* and the hydraulic pressure sensor 20 comes loose from the first receptive opening 57*a*. In contrast with this, in the present embodiment, when the hydraulic pressure sensor 20 is inserted into the receptive portion 57, the insertion guide portion 55*b* is inserted into the insertion groove 41*a*, and the case facing faces 41*b* and the protruding-portion-facing faces 55*c* each extending in straight lines following the depth direction Y face each other, as illustrated in FIG. 3. Accordingly, when the hydraulic pressure sensor 20 tries to rotate on the second center axis J2, the protruding-portion-facing faces 55*c* come into contact with the case facing faces 41*b*. Thus, the hydraulic pressure sensor 20 can be suppressed from rotating on the second center axis J2. Consequently, in the attached state, the facing portion 44 can be suppressed from coming loose from the first movement restricting face 52a, and the hydraulic pressure sensor 20 can be suppressed from coming loose from the first receptive opening 57a.

The present invention is not restricted to the above-described embodiment; other configurations may be employed as well. In the following description, description of configurations that are the same as those described above may be omitted by denoting these configurations by the same symbols or the like.

The second wall portion 52 may extend linearly in the lateral direction X. The second wall portion 52 does not have to be connected to the first wall portions 51. Further, the sensor case 40 may be a single member.

Second Embodiment

Figure 4:
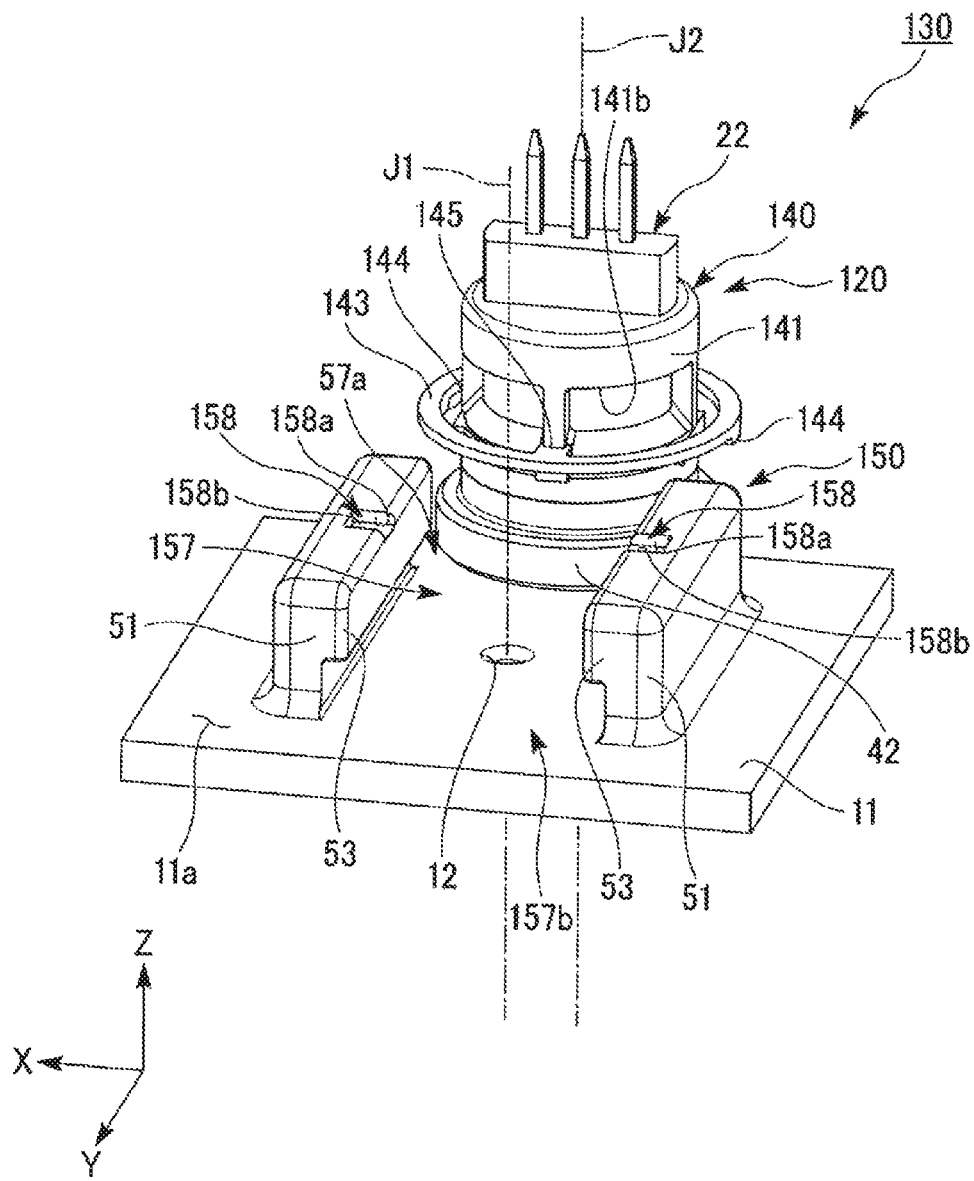
FIG. 4 is a perspective view illustrating a hydraulic pressure sensor attachment structure according to a second embodiment.
Figure 5:
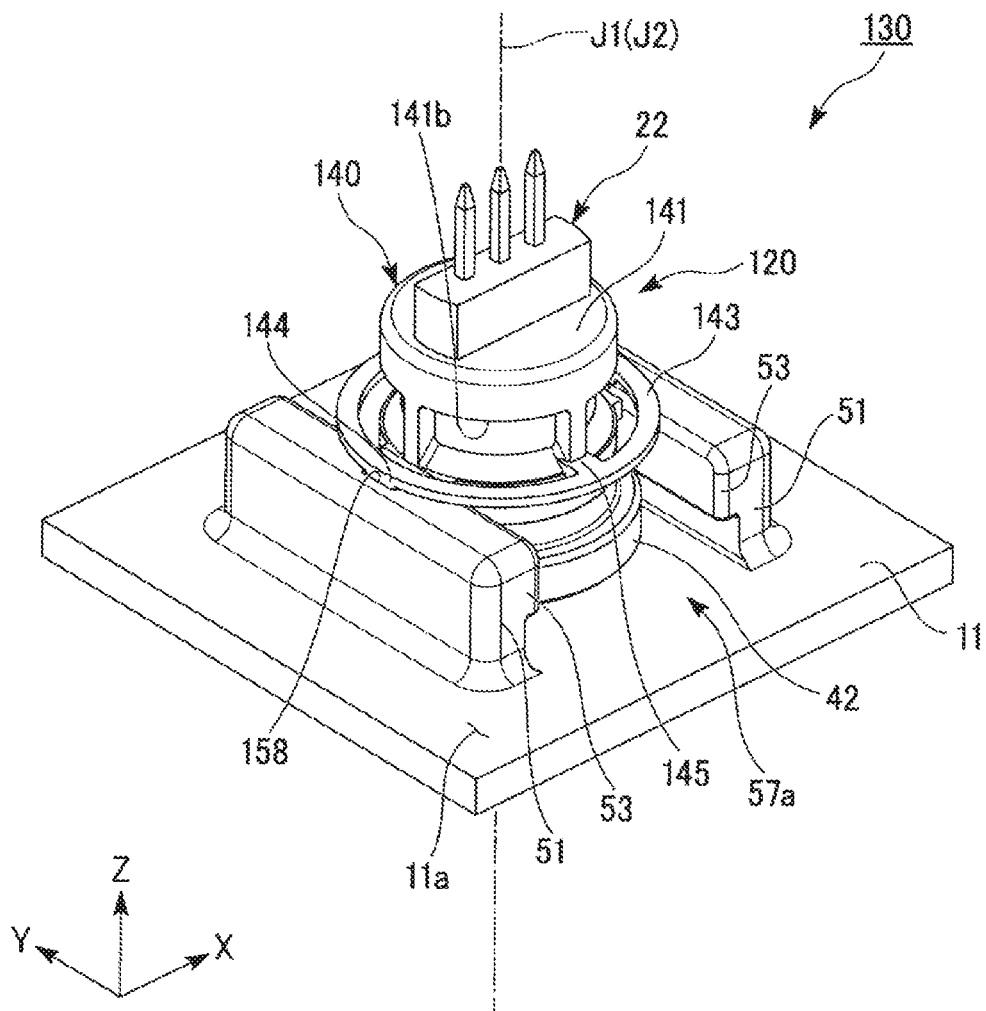
FIG. 5 is a perspective view illustrating the hydraulic pressure sensor attachment structure according to the second embodiment.

In a hydraulic pressure sensor attachment structure 130 according to a second embodiment, the second wall portion 52 is not provided to a guide protruding portion 150, and the pair of first wall portions 51 are not connected to each other, unlike the first embodiment, as illustrated in FIGS. 4 and 5. Note that FIG. 4 illustrates an unattached state, and FIG. 5 illustrates an attached state.

The guide protruding portion 150 has recesses 158. The recesses 158 are provided to each of the pair of first wall portions 51 in the present embodiment. The recesses 158 are recessed from the upper face of the first wall portions 51 toward the lower side. The recesses 158 are provided spanning the upper face of the first protruding portions 53 and open to the inner side in the lateral direction. The shape of the recesses 158 as viewed from above is rectangular.

Of the inner side faces of the recesses 158, the faces orthogonal to the depth direction Y are first movement restricting faces 158a facing the front side, and second movement restricting faces 158b facing the back side. That is to say, the guide protruding portion 150 has the first movement restricting faces 158a and second movement restricting faces 158b, where the first movement restricting faces 158a and second movement restricting faces 158b are inner side faces of the recesses 158 facing each other across gaps depth direction Y.

A receptive portion 157 has a second receptive opening 157b that opens toward the front side. The second receptive opening 157b faces the first receptive opening 57a in the depth direction Y. That is to say, the receptive portion 157 opens to both sides in the depth direction Y. The receptive portion 157 is capable of receiving the sensor case 140 from the second receptive opening 157b along the depth direction Y. Accordingly, the hydraulic pressure sensor 120 can be inserted into the receptive portion 57 from either side in the depth direction Y.

Grooves 141b are provided on the outer peripheral face of a column-shaped portion 141, recessed toward the inner side of the radial direction centered on the second center axis J2. The grooves 141b extend in the circumferential direction centered on the second center axis J2. Multiple grooves 141b are provided following the circumferential direction centered on the second center axis J2.

The sensor case 140 has an annular portion 143 surrounding the column-shaped portion 141, and a connecting portion 145 connecting the annular portion 143 and column-shaped portion 141. The annular portion 143 has a toric shape centered on the second center axis J2. The annular portion 143 is disposed further toward the upper side than the first wall portions 51. The connecting portion 145 connects the inner peripheral face of the annular portion 143 and the outer peripheral face of the column-shaped portion 141. Two are provided of the connecting portion 145, across the column-shaped portion 141 in the depth direction Y.

Facing portions 144 protrude toward the lower side from the annular portion 143 in the present embodiment. Two facing portions 144 are provided, across the column-shaped portion 141 in the lateral direction X. The lower ends of the facing portions 144 are positioned further toward the lower side than the upper ends of the first wall portions 51. In the attached state, the facing portions 144 are each fit to the recesses 158 provided to the pair of first wall portions 51, as illustrated in FIG. 5. The facing portions 144 each face both the first movement restricting face 158a and second movement restricting face 158b in the recesses 158 in the depth direction Y. Accordingly, the facing portions 144 engage both the first movement restricting faces 158a and second movement restricting faces 158b, and thus the hydraulic pressure sensor 120 can be suppressed from moving to either side in the depth direction. As a result, the hydraulic pressure sensor 120 can be suppressed from coming loose from the first receptive opening 57a and second receptive opening 157b. Further, the first movement restricting faces 158a and second movement restricting faces 158b are provided to each of the pair of first wall portions 51. Accordingly, the hydraulic pressure sensor 120 can be suppressed from rotating on the second center axis J2 by the two first movement restricting faces 158a and second movement restricting faces 158b.

In the present embodiment, when the hydraulic pressure sensor 120 is moved in the depth direction Y and started to be inserted into the receptive portion 157, the facing portions 144 are elastically displaced toward the upper side to a position where the lower ends of the facing portions 144 come into contact with the upper faces of the first wall portions 51. At this time, the facing portions 144 are provided to the annular portion 143 in the present embodiment, so elastic deformation of the annular portion 143 facilitates elastic displacement of the facing portions 144. Accordingly, the hydraulic pressure sensor 120 is readily inserted into the receptive portion 157. When the hydraulic pressure sensor 120 is further inserted into the receptive portion 157 and the facing portions 144 reach the position of the recesses 158, the facing portions 144 and annular portion 143 move toward the lower side by restoration, and thus the facing portions 144 are fit to the recesses 158. Thus, the facing portions 144 can be fit to the recesses 158 by snap-fitting in the present embodiment, so the hydraulic pressure sensor 20 can be attached by the hydraulic pressure sensor attachment structure 130 more readily.

Third Embodiment

Figure 6:
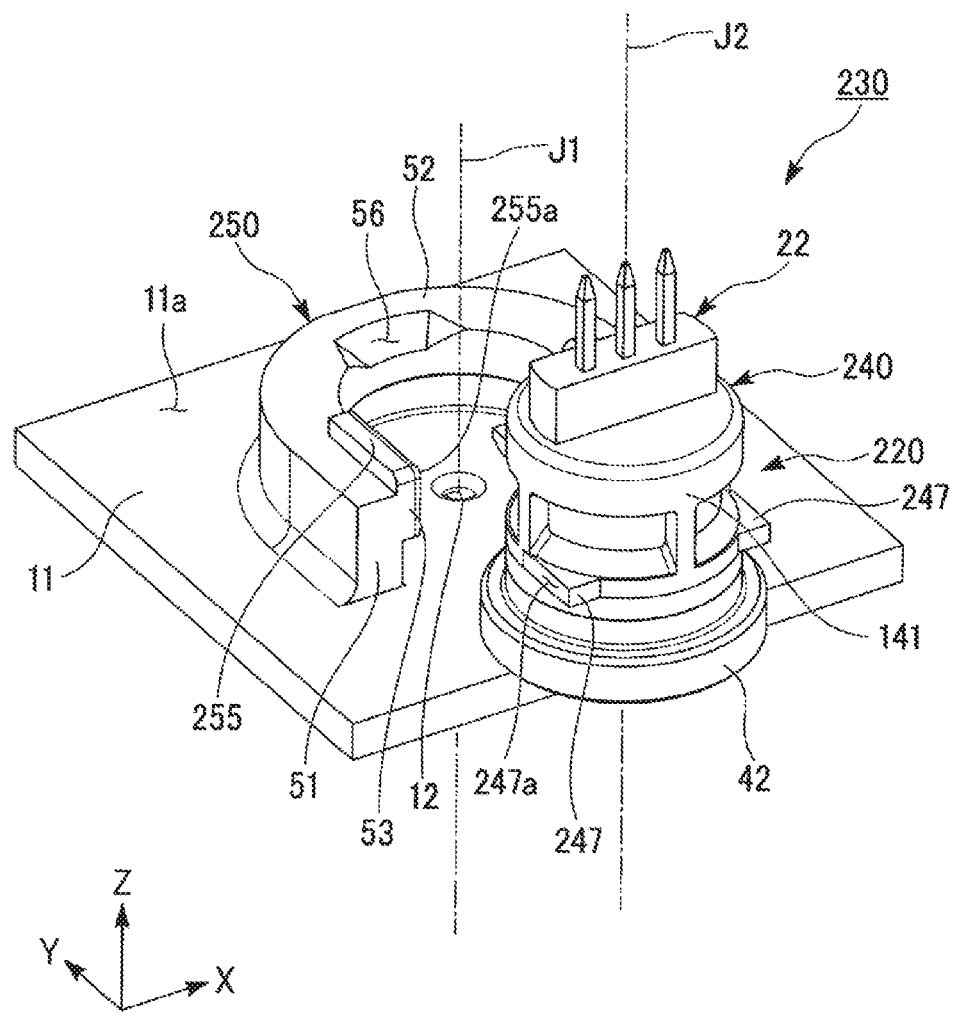
FIG. 6 is a perspective view illustrating a hydraulic pressure sensor attachment structure according to a third embodiment.

Rotation restricting portions 255 of a guide protruding portion 250 protrude upwards from the first protruding portions 53 of a hydraulic pressure sensor attachment structure 230 according to a third embodiment, as illustrated in FIG. 6. The rotation restricting portions 255 extend in the depth direction Y. Protruding-portion-facing faces 255a are faces on the inner side in the lateral direction of the rotation restricting portions 255 in the present embodiment. Note that FIG. 6 illustrates an unattached state.

A sensor case 240 of a hydraulic pressure sensor 220 has rotation-restricting protruding portions 247. The rotation-restricting protruding portions 247 protrude toward the outer side from the outer peripheral face of the column-shaped portion 141, in the radial direction centered on the second center axis J2. Two rotation-restricting protruding portions 247 are provided across the column-shaped portion 141 in the lateral direction X. Case facing faces 247a in the present embodiment are faces on the outer side in the lateral direction X of the rotation-restricting protruding portions 247. In the attached state, the case facing faces 247a and the protruding-portion-facing faces 255a are disposed facing each other. Accordingly, the hydraulic pressure sensor 220 can be suppressed from rotating on the second center axis J2.

It is sufficient for an oil channel body to which a hydraulic pressure sensor can be attached by the hydraulic pressure sensor attachment structures according to the above-described embodiments to have an oil channel within, through which oil flows, and the oil channel body is not restricted in particular. The hydraulic pressure sensor attachment structures according to the embodiments may be applied to a structure for attaching a hydraulic pressure sensor to an electric oil pump, for example.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydraulic pressure sensor attachment structure comprising:
    a guide protruding portion; and
    a sensor case,
    wherein the hydraulic pressure sensor attachment structure is configured to attach a hydraulic pressure sensor that measures pressure of oil flowing through an oil channel of an oil channel body having the oil channel therein, to an upper face of the oil channel body,
    wherein the oil channel body has, on the upper face, an oil channel opening connecting to the oil channel,
    wherein the hydraulic pressure sensor includes
        a sensor main unit, and
        the sensor case covering the sensor main unit,
    wherein the sensor case has, on a lower face thereof, a sensing hole that connects to the oil channel opening in a state where the hydraulic pressure sensor is attached to the upper face,
    wherein the guide protruding portion is disposed on the upper face and includes
        a pair of first wall portions that protrude toward an upper side from the upper face, and face each other across the oil channel opening in a first direction out of horizontal directions, and
        first protruding portions that protrude from each first wall portion toward the opposing first wall portion at the other side, and face each other in the first direction across a gap,
    wherein a receptive portion is provided between the first wall portions,
    wherein the receptive portion has a first receptive opening that opens to one side in a second direction orthogonal to the first direction out of horizontal directions, and the sensor case can be received from the first receptive opening following the second direction,
    wherein the guide protruding portion has a first movement restricting face that faces another side in the second direction,
    and wherein the sensor case includes
        a column-shaped portion extending in a vertical direction and passed through the gap between the first protruding portions,
        a flange portion that protrudes toward an outer side from the column-shaped portion in a radial direction of the column-shaped portion, and that is at least partially situated between the upper face and the first protruding portions in the vertical direction, within the receptive portion, and
        a facing portion that is disposed on the other side of the first movement restricting face in the second direction and faces the first movement restricting face.

2. The hydraulic pressure sensor attachment structure according to claim 1,
    wherein the guide protruding portion has a second wall portion that protrudes toward the upper side from the upper face,
    wherein the second wall portion is disposed facing the first receptive opening across a gap in the second direction, and facing the first receptive opening across the oil channel opening,
    and wherein the first movement restricting face is provided to the second wall portion.

3. The hydraulic pressure sensor attachment structure according to claim 2,
    wherein the guide protruding portion has a second protruding portion protruding from the second wall portion toward the first receptive opening side in the second direction,
    and wherein part of the flange portion is disposed between the upper face and the second protruding portion in the vertical direction.

4. The hydraulic pressure sensor attachment structure according to claim 2,
    wherein the sensor case includes an extending portion that extends in the second direction from a portion further toward the upper side on the column-shaped portion than the second wall portion,
    wherein the extending portion extends in the second direction to the opposite side of the second wall portion from first receptive opening,
    wherein the facing portion is provided on the tip of the extending portion, and
    wherein the second wall portion has the first movement restricting face on a face at the opposite side from the first receptive opening.

5. The hydraulic pressure sensor attachment structure according to claim 1,
    wherein the guide protruding portion includes
        a recess, and
        a second movement restricting face facing one side in the second direction,
    wherein the receptive portion has a second receptive opening that opens to the other side in the second direction, and the receptive portion is capable of receiving the sensor case from the second receptive opening along the second direction,
    wherein the first movement restricting face and second movement restricting face are inner side faces of the recess, and face each other in the second direction across a gap,
    and wherein the facing portion faces both the first movement restricting face and second movement restricting face in the second direction within the recess.

6. The hydraulic pressure sensor attachment structure according to claim 5,
    wherein the recess is recessed toward the lower side from the upper face of the first wall portions,
    wherein the sensor case has an annular shape surrounding the column-shaped portion, and wherein the facing portion protrudes toward the lower side from the annular portion, and is fit to the recess.

7. The hydraulic pressure sensor attachment structure according to claim 1,
wherein the sensor case has a case facing face that extends in a straight line in the second direction,
wherein the guide protruding portion has a protruding-portion-facing face that extends in a straight line in the second direction,
and wherein the case facing face and the protruding-portion-facing face are disposed facing each other.

8. The hydraulic pressure sensor attachment structure according to claim 1,
wherein the facing portion is a claw portion that hooks onto the first movement restricting face.

* * * * *